United States Patent [19]
Kronfli et al.

[11] Patent Number: 6,037,080
[45] Date of Patent: Mar. 14, 2000

[54] ORGANIC ELECTROLYTE COMPOSITION

[75] Inventors: Esam Kronfli, Swindon; Christine Ruth Jarvis, Tewkesbury, both of United Kingdom

[73] Assignee: AEA Technology plc, Didcot, United Kingdom

[21] Appl. No.: 08/787,166

[22] Filed: Jan. 23, 1997

[30] Foreign Application Priority Data

Jan. 31, 1996 [GB] United Kingdom .................... 9601890
Sep. 6, 1996 [GB] United Kingdom .................... 9618695

[51] Int. Cl.⁷ .................................................. H01M 10/40
[52] U.S. Cl. .......................... 429/188; 429/192; 429/194; 429/212; 429/213; 525/301
[58] Field of Search ..................................... 429/129, 194, 429/188, 192, 212, 213; 525/301

[56] References Cited

U.S. PATENT DOCUMENTS

| | | |
|---|---|---|
| 3,427,206 | 2/1969 | Scardaville et al. . |
| 4,110,143 | 8/1978 | Cogliano et al. ........................ 156/167 |
| 4,129,617 | 12/1978 | Machi . |
| 4,143,218 | 3/1979 | Adams ..................... 429/254 |
| 4,201,641 | 5/1980 | Gotoda et al. ..................... 204/159.17 |
| 4,283,442 | 8/1981 | Machi et al. .............................. 427/171 |
| 4,804,598 | 2/1989 | Jackovitz et al. ........................ 429/254 |
| 5,296,318 | 3/1994 | Gozdz ...................... 429/192 |
| 5,326,825 | 7/1994 | Nasman et al. .......................... 525/301 |
| 5,415,958 | 5/1995 | Takahashi et al. ........................ 429/217 |
| 5,580,679 | 12/1996 | Tanaka ..................... 429/185 |
| 5,614,574 | 3/1997 | Sheth ...................... 524/140 |
| 5,777,038 | 7/1998 | Nishikawa et al. ..................... 525/295 |

FOREIGN PATENT DOCUMENTS

| | | |
|---|---|---|
| 0214880 | 3/1987 | European Pat. Off. . |
| 0245000 | 11/1987 | European Pat. Off. . |
| 3-59058 | 3/1991 | Japan . |
| 7-201316 | 8/1995 | Japan . |
| 2072203 | 9/1981 | United Kingdom . |
| 2088883 | 6/1982 | United Kingdom . |

OTHER PUBLICATIONS

Derwent abstract of JP 3–59058.

*Primary Examiner*—Jeffrey C. Mullis
*Attorney, Agent, or Firm*—William H. Holt

[57] ABSTRACT

A polymeric chain consisting primarily of vinylidene fluoride, onto which is grafted a mono-unsaturated carboxylic acid, ester, or amide, for example acrylic acid, may be combined with a lithium salt and a solvent to form an electrolyte material. This may be used as electrolyte in a lithium cell, or may be combined with an insertion material to make a composite electrode for such a cell. The electrolyte, and so also the composite electrode incorporating this electrolyte, adheres well to a metal current collector.

11 Claims, 2 Drawing Sheets

ORGANIC ELECTROLYTE COMPOSITION

This invention relates to an electrolyte including a polymer composition suitable for use in electrochemical cells, and to an electrochemical cell incorporating this electrolyte.

For many years it has been known to make rechargeable cells with lithium metal anodes, and cathodes of a material into which lithium ions can be intercalated or inserted. Such cells may use a separator such as filter paper or polypropylene saturated with, as electrolyte, a solution of a lithium salt (e.g. lithium perchlorate) in an organic liquid such as propylene carbonate. Alternatively they may use a solid-state ion-conducting polymer, for example a complex of a lithium salt with poly(ethylene oxide). A wide variety of intercalation or insertion materials are known as cathode materials, such as $TiS_2$, $V_6O_{13}$ and $Li_xCoO_2$ where x is less than 1; and these materials are often mixed with solid electrolyte material to form a composite cathode. To avoid the problems arising from dendrite growth at the anode, it has been proposed to use an intercalation material as the anode material too, and this also may be mixed with solid electrolyte material to form a composite anode. Similar cells can be made in which sodium takes the place of lithium.

An alternative type of polymer electrolyte has recently been proposed by Gozdz et al (U.S. Pat. No. 5,296,318), which comprises a copolymer of 75 to 92% vinylidene fluoride and 8 to 25% hexafluoropropylene, blended with a lithium salt and a compatible solvent such as ethylene carbonate/propylene carbonate mixture. This is said to provide a stable film with conductivity in the range $10^{-4}$ to $10^{-3}$ S $cm^{-1}$. Gozdz et al. (U.S. Pat. No. 5,429,891) have also described a modification, in which this copolymer is crosslinked in the presence of a cross-linking agent (acrylate ester, di- or triallyl ester, or di- or triglycidyl ether) and a plasticizer. The crosslinking is carried out in the presence of actinic radiation such as an electron beam. The plasticizer may be a known plasticizer such as dibutyl phthalate, or may be for example propylene carbonate which also acts as a solvent for the electrolyte salt. However, when assembling such polyvinylidene-based electrolytes into a cell, the polymer electrolyte does not adhere readily to the metal current collectors of the electrodes.

According to the present invention there is provided an electrolyte comprising a polymer material comprising a polymeric chain consisting primarily of vinylidene fluoride, onto which is grafted a monounsaturated carboxylic, sulphonic or phosphonic acid, ester, or amide, the electrolyte also comprising a salt and a compatible organic solvent.

The polymeric chain may be a homopolymer, i.e. polyvinylidene fluoride (PVdF), or may be a copolymer or terpolymer of vinylidene fluoride (VdF) and other monomers such as hexafluoropropylene (HFP), chlorotrifluoroethylene (CTFE), or tetrafluoroethylene (TFE), and in these cases the proportion of VdF is preferably no less than 75% by weight.

The monomers to be grafted must have only one double-bond in the carbon chain R—, and one or more carboxyl groups —COOH, sulphonic acid groups —$SO_2OH$, phosphonic acid groups —$PO(OH)_2$, ester groups —COOR', or amide groups —$CONH_2$. Generally smaller monomers, with less than five carbon atoms in the carbon chain R—, are preferable. For example acrylic acid; crotonic acid, vinylacetic acid, methylacrylic acid (isomers of butenoic acid); isomers of pentenoic acid such as allylacetic acid, or tiglic acid; or, as examples of monomers with more than one acid group, itaconic acid or maleic acid. The corresponding amides such as acrylamide may also be used. In an ester, the group R' might be methyl, ethyl, or butyl; for example esters such as methyl acrylate or butyl acrylate may be used. Vinyl or styrene sulphonic acid may be used. The most preferred monomers to be grafted are acrylic acid or methacrylic acid. The grafting may be achieved by an irradiation process. For example the polymer chain substrate and the graft monomer material together may be subjected to continuous or intermittent irradiation, or more preferably the substrate may be pre-irradiated before it is brought into contact with the graft monomer material. The radiation may for example be an electron beam, or X-rays or γ-rays. The irradiation activates the substrate, apparently by generating free radicals.

The degree of grafting is determined by several factors, the most important being the length of time that the activated substrate is in contact with the graft monomer material, the extent of pre-activation of the substrate by the irradiation, the extent to which the graft monomer material can penetrate the substrate, and the temperature of the substrate and monomer material when in contact. If the graft monomer material is an acid, the degree of grafting can be monitored by sampling the solution containing the monomer, and titrating against a base to find the concentration of the acidic monomer remaining. The degree of grafting in the resulting composition is desirably between 2 and 20% of the final weight, more preferably between 3 and 12%, for example 5% or 10%.

In a second aspect the present invention provides an electric cell incorporating as an electrolyte material the said electrolyte material. The cell may be a lithium cell.

The electrolyte material may be used in a composite cathode, and/or in a composite anode, and/or between an anode and a cathode. Some components of the cell may incorporate the electrolyte of the invention, while other components incorporate different electrolytes. Alternatively and preferably the cell may be a rechargeable lithium-ion cell (that is, without lithium metal) using a composite anode and a composite cathode each comprising the electrolyte material mixed with appropriate insertion materials, for example graphite in the anode (which intercalates lithium ions to form $Li_yC_6$), and for example $Li_xCoO_2$ in the cathode. The composite anode and cathode would be separated by a sheet of the electrolyte material; and each would be in electrical contact with a current collector such as a nickel foil.

If the cell is a lithium cell (or a lithium ion cell) then the salt will be a lithium salt, such as lithium perchlorate $LiClO_4$. Other suitable salts are $LiAsF_6$, $LiPF_6$, $LiBF_4$, $LiN(SO_2CF_3)_2$, or $LiCF_3SO_3$. A variety of compatible solvents may be used, in particular ethylene carbonate or propylene carbonate; alternative solvents are dimethylcarbonate, diethoxyethane, diethyl carbonate, or dimethoxyethane. Plasticisers such as tetraethylene glycol dimethyl ether (tetraglyme), or N-methyl-pyrrolidone (1-methyl-2-pyrrolidone) may also be provided, to ensure that the solvent does not crystallize at the desired operating temperature and so to ensure adequate electrical conductivity.

It will be appreciated that the electrolyte material may instead be made with the said polymer material and the said solvent, but without the lithium salt. A cell as described above may be assembled using this salt-free electrolyte material, and the salt solution added later. Similarly the electrolyte may be initially made without the said solvent, or with only a proportion of the required solvent, the requisite solvent being added later.

The invention will now be further and more particularly described, by way of example only, and with reference to the accompanying drawings in which.

EXAMPLE 1

Polymer Material Preparation

Figure 1:
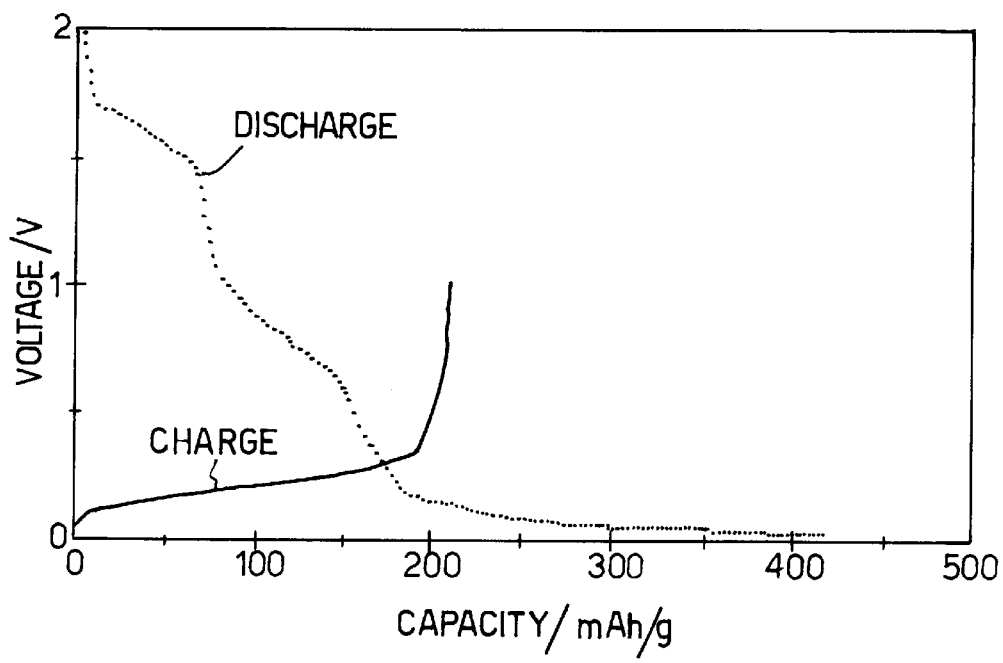
FIG. 1 shows, graphically, the characteristics of the first discharge and charge of a test cell.

PVdF powder (Atochem Kynar Flex 461:trade marks) was irradiated by a cobalt-60 gamma source for a total dose of 15 kgray, at a dose rate of 1 kgray hour$^{-1}$. The irradiated PVdF powder was then placed in a reaction vessel containing a de-oxygenated aqueous solution of methacrylic acid (25% by weight) also containing ferrous sulphate (0.02 M) as a homopolymerisation inhibitor. This reaction mixture was held at 80° C. and the progress of the reaction with the methacrylic acid was monitored at intervals by taking a sample of the mixture and determining the remaining concentration of the acid by titration with sodium hydroxide.

After a few hours, when the desired consumption of methacrylic acid had been achieved, the resulting graft copolymer powder was washed several times with deionised water, and then dried in a vacuum oven for 24 hours at 50° C. The weight of the powder was found to have increased, the increase being equal to 10% of the final weight, as a consequence of the grafting of methacrylic acid into the PVdF chain.

Electrolyte Preparation 1.0 g PVdF-g-methacrylic acid graft polymer and 0.4 g LiClO$_4$ were dissolved in 8.0 g dimethyl acetamide (DMA). 3.0 g ethylene carbonate (EC) and, as plasticizer, 1.0 g tetraethylene glycol dimethyl ether (tetraglyme or TG) were added to the solution which was stirred continuously whilst heating to dissolve the copolymer. The solution was poured into a glass petri dish and left in a dry room for 5 days for the casting solvent (the DMA) to evaporate, leaving an electrolyte film.

The conductivity of the resulting polymer film was measured at room temperature (about 20° C.) and was found to be $3 \times 10^{-3}$ S cm$^{-1}$.

Composite Electrode Preparation 1.0 g PVdF-g-methacrylic acid graft copolymer and 0.4 g LiClO$_4$ were dissolved in 11.1 g dimethyl acetamide (DMA). 3.0 g EC and 1.0 g tetraglyme were added to the solution which was stirred continuously whilst heating to dissolve the copolymer. 4.0 g graphite was added to the solution whilst stirring. The mix became very viscous and 8.0 g acetone was added as a diluent. The mix was coated on a copper current collector using the doctor blade technique, and left in the dry room overnight for the casting solvents (acetone and DMA) to evaporate.

A significant improvement in the adhesion of the composite electrode to the copper current collector was observed compared to composite electrodes containing an 88:12 VdF:HFP copolymer Atochem 2801 Kynar Flex (trade marks) of molecular weight about $380 \times 10^3$.

Test Cell Fabrication

Test cells were made using the electrolyte of the invention only in the composite graphite-containing electrode described above.

The composite electrodes were vacuum dried for 2 hours at room temperature prior to test cell fabrication. In the test cells these electrodes were used as cathodes with lithium metal foil for the anodes and with a poly(ethylene oxide) (PEO)-based electrolyte between the anode and cathode comprising three layers of composition, PEO$_6$ LiClO$_4$+70% (3EC+TG). Cells had an active area of 18 cm$^2$ and were tested on constant current mode between voltages of 1.00 V and 0.01 V at 1.35 mA. This PEO-based electrolyte provides good conductivity at room temperature, the EC and TG acting as a plasticizer.

Referring to the drawing, this shows how the cell voltage varied during the first discharge and then the first charge of one such test cell. The cell voltage is plotted against the cell capacity expressed in mAh per gram of graphite; it will be appreciated that the capacity is simply related to the quantity of lithium inserted into the graphite, for example a capacity of 200 mAh g$^{-1}$ corresponds to formation of Li$_{0.54}$C$_6$. The reversible plateau is that at 0.1 to 0.2 V.

The PVdF homopolymer used in the above example (grade 461) can be characterised by its melt flow rate, measured under ASTM D 1238 at 232° C., which is 5.5–14 g/10 min at a load of 21.6 kg. Better quality PVdF homopolymer electrolyte films can be made using the same procedure described above, but using a homopolymer with a lower melt flow rate. This produces a film with greater mechanical strength than that described above, and with similar electrical properties.

EXAMPLE 2

This example relates to production of such a better-quality electrolyte, using PVdF powder Solef grade 1015 (Solef is a trade mark of Solvay). This grade of PVdF homopolymer has a melt flow rate measured under ASTM D 1238 of 0.7 g/10 min at a load of 10 kg and 0.2 g/10 min at a load of 5 kg (and hence about 2 g/10 min at a load of 21.5 kg), which is markedly less than that of grade 461 PVdF.

The PVdF powder (grade 1015) was irradiated as described above, and then reacted with acrylic acid so as to graft acrylic acid into the PVdF chain, so the increase in weight was again about 10% of the final weight.

Composite Electrode Preparation

A slurry was made of 24.0 g of graphite powder, 6.0 g of the PVdF-g-acrylic acid, 12.0 g ethylene carbonate, 6.0 g propylene carbonate and 3.91 g lithium imide (LiN (CF$_3$SO$_2$)$_2$), in 78.0 g dimethyl acetamide (DMA). The slurry was subjected to low shear and high shear mixing to ensure homogeneity, and then allowed to cool to room temperature. The slurry was then coated onto aluminium foil at 1 m/min using a 0.5 mm blade gap, and the casting solvent DMA evaporated by passage through successive drying zones at temperatures of 110°, 112° and 130° C.

For comparison purposes a composite electrode layer was prepared in the way described above, but using ungrafted PVdF (grade 1015).

Mechanical Tests

Peel tests were performed to ASTM D1876-72 using samples of dimensions 30 cm×2.5 cm with a 22.5 cm bonded length. The samples were tested on a Lloyd M5K tensile tester with a 50N load cell and fitted with soft grips for the foils. The crosshead speed was 254 mm/min. Each sample consisted of two copper foils with a layer of the composite electrode composition sandwiched between them.

The surfaces of the copper foils were gently rubbed with a tissue soaked in a 0.1% wt solution of oxalic acid in N-methyl pyrrolidone (NMP) to form a uniform layer. The treated foils were then placed in an oven at 130° C. for 15 min to allow the NMP solvent to evaporate and the acid to etch the foil surfaces. The layers of composite electrode (with the PVdF-g-acrylic acid, and with ungrafted 1015 PVdF for comparison) were cast as described above, then stripped off the aluminium foil and hot pressed between treated surfaces of the copper foils at 275° C. for 10 min at an applied pressure of about 210 kPa (30 psi).

The results of the peel tests on three samples of each type of composite anode material (Samples P contain PVdF, Samples G contain PVdF-g-AA) are shown in the Table:

| Sample | Average load/N | Maximum load/N | Minimum load/N | Average strength N/mm |
|--------|----------------|----------------|----------------|----------------------|
| P1     | 0.114          | 0.575          | 0.000          | 0.0045               |
| P2     | 0.101          | 0.420          | 0.000          | 0.0040               |
| P3     | 0.106          | 0.520          | −0.033         | 0.0042               |
| Mean   | 0.107          | 0.525          |                | 0.0043               |
| G1     | 0.285          | 1.095          | 0.000          | 0.0114               |
| G2     | 0.155          | 0.718          | 0.000          | 0.0062               |
| G3     | 0.225          | 0.912          | 0.000          | 0.0090               |
| Mean   | 0.222          | 0.908          |                | 0.0089               |

It is clear that the bond between the copper foil and the composite anode layer is significantly higher when using the acrylic acid grafted PVdF than when using the ungrafted PVdF.

EXAMPLE 3

This example relates to the electrical properties of half cells incorporating acrylic acid grafted PVdF Solef grade 1015, in comparison to half cells using ungrafted PVdF grade 1015. The PVdF-g-acrylic acid was made as described above in Example 2.

Cell Production 3.0 g PVdF was dispersed in a small volume of methanol to which 14.5 g N-methyl pyrrolidone (NMP) and 20 cm$^3$ dimethyl acetamide (DMA) were added to dissolve the PVdF. 1.2 g LiClO$_4$, 9.2 g ethylene carbonate, 12.0 g graphite, 25 cm$^3$ acetone and a further 5.0 g NMP were added to the PVdF solution, and the mixture stirred and heated. The resulting slurry was cast onto a copper foil current collector and dried to evaporate the methanol, acetone and DMA. In one case this procedure was performed using the PVdF-g-acrylic acid, while for comparison purposes it was repeated using ungrafted PVdF (grade 1015).

Lithium half cells were then constructed by coating a first layer of PVdF-based electrolyte directly onto the composite graphite electrode; coating a second layer of this electrolyte onto release paper, drying it, peeling it from the release paper, and rolling this electrolyte layer onto the first electrolyte layer. A lithium metal electrode was then laminated onto the second electrolyte layer at a temperature of 80° C. and a pressure of one atmosphere. In both the test cell and the comparison cell the PVdF-based electrolyte used ungrafted PVdF grade 1015, and was cast from a mixture of 8.75 g NMP, 8.75 g ethylene carbonate, 26.0 g tetrahydrofuran (THF), 2.0 g LiClO$_4$ and 5.0 g PVdF. The THF was evaporated by passing the cast layers through successive drying zones at 50°, 55° and 60° C.

Cell Tests

Figure 2:
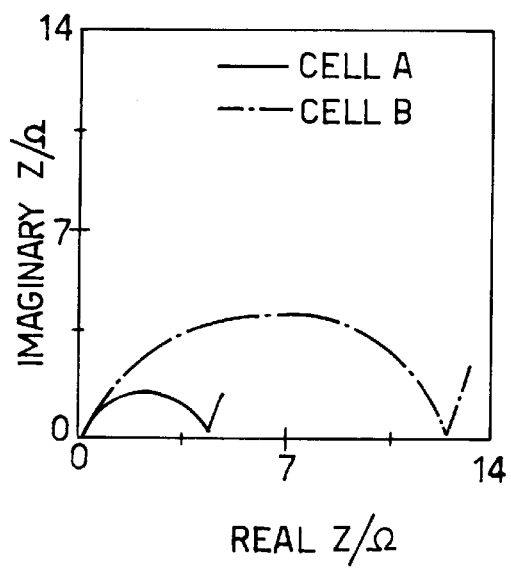
FIG. 2 shows, graphically, the initial impedance plots for two different cells.
Figure 3:
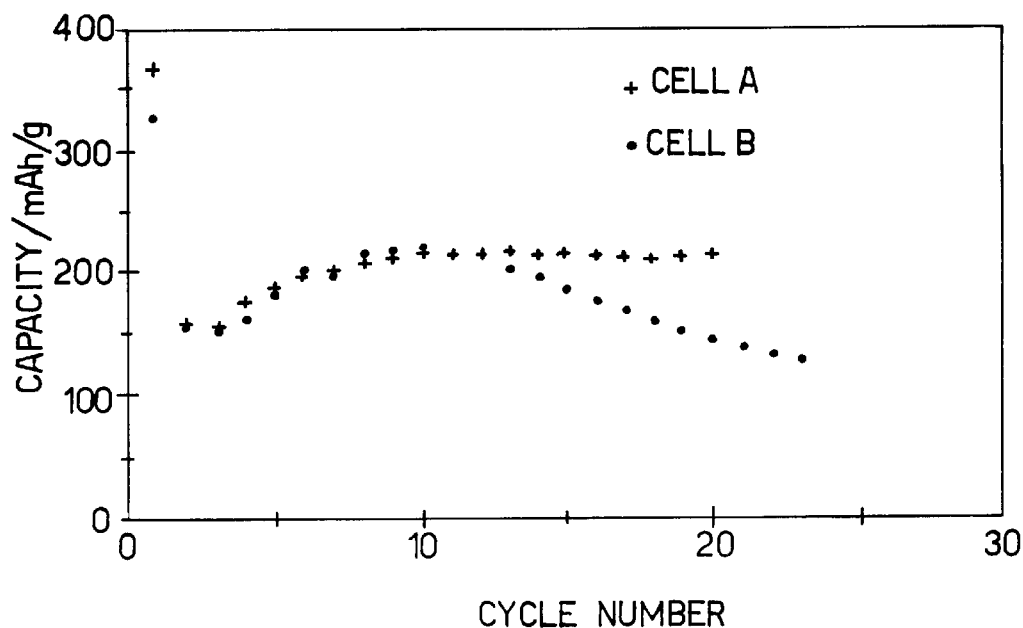
FIG. 3 shows, graphically, the variations in cell capacity with the number of cycles, for the two different cells.

The lithium half cell with grafted PVdF in the composite graphite electrode (cell A) and the comparison cell with ungrafted PVdF (cell B) were then subjected to two tests the results of which are shown in FIGS. 2 and 3.

FIG. 2 shows the initial cell impedance plots for varying frequency. The intercept with the real impedance axis nearest the origin represents the resistance of the electrolyte, while the intercept further from the origin represents the interfacial resistances in the cell. It is evident that the cell A with PVdF-g-acrylic acid has significantly lower interfacial resistances than the comparison cell B.

FIG. 3 shows how the energy capacity of each cell varies with successive discharge/recharge cycles. It is evident that the cell A with PVdF-g-acrylic acid maintains its capacity, while that of the comparison cell B gradually decreases.

EXAMPLE 4

This relates to the production of a lithium ion cell, with a composite cathode containing lithium nickel oxide as an insertion material, a composite anode containing graphite as an insertion material, and a layer of electrolyte sandwiched between the anode and the cathode. Ungrafted electrolyte material was used in the cathode and in the electrolyte layer. In the anode the electrolyte material used was based on PVdF 1015 onto which acrylic acid had been grafted by the pre-irradiation process described in relation to Example 2.

The cathode comprises an aluminium foil current collector which is firstly coated with a dag (Acheson Electrodag 109B; trade mark) carbon layer. A composite cathode mixture comprising Li$_x$NiO$_2$, carbon black, and a mixture of ungrafted 1015 PVdF, EC and LiClO$_4$, is cast onto the carbon-coated aluminium foil using dimethyl acetamide (DMA) and acetone as solvents. An electrolyte layer comprising ungrafted 1015 PVdF, EC, NMP, and LiClO$_4$ is then cast onto the composite cathode, using THF as the volatile solvent.

The anode comprises a copper foil current collector, onto which is cast a composite anode mixture comprising graphite mixed with acrylic acid grafted 1015 PVdF, EC, NMP and LiClO$_4$, using acetone as the volatile solvent. A layer of electrolyte comprising ungrafted PVdF, EC, NMP and LiClO$_4$ is then cast onto the composite anode, using THF as the volatile solvent. This is then assembled with the cathode and electrolyte layer described above and held together under pressure at 100° C. so the two electrolyte layers bond together.

Cell Cycling

Figure 4:
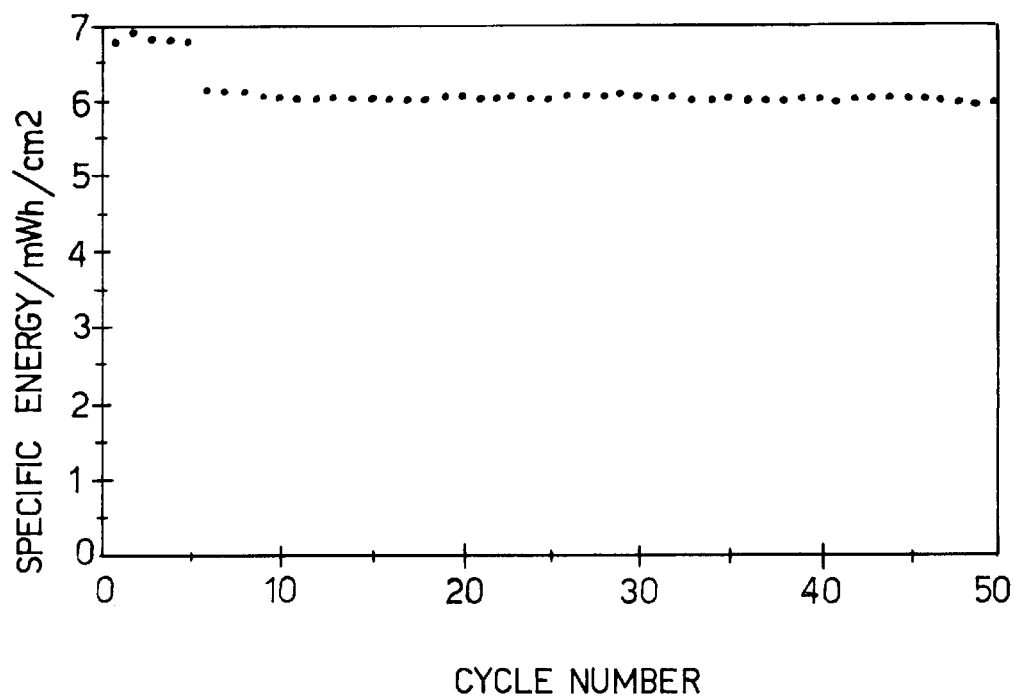
FIG. 4 shows, graphically, the variation in specific energy of a cell with the number of cycles.

The cell made as described above was repeatedly discharged and recharged, between voltage limits of 4.0 V and 3.0 V. The first five cycles were at a current of 17 mA and enabled the cell capacity to be determined; the subsequent cycles were at the C/5 rate which is a slightly higher current. As shown in FIG. 4, which shows graphically the variation of the specific energy with cycle number, there is very little change over 50 cycles. Such a cell has been cycled as many as 500 times, and still provides a specific energy of over 3 mWh/cm$^2$.

EXAMPLE 5

It will be appreciated that cells incorporating the grafted PVdF may use a variety of different salts. An alternative composition of a composite anode consists of 6 g grafted PVdF, 24 g graphite, 30 g ethylene carbonate/diethyl carbonate (EC/DC) mixture containing a 1M concentration of LiPF$_6$, and 9 g propylene carbonate (PC), and may be cast using 20 ml acetone and 50 g DMA as volatile solvents.

It will be noticed from the above Examples that the ratio of the weight of the liquids (solvent for the salt plus plasticizer) in the composite electrode or electrolyte, and the weight of the grafted PVdF varies between about 3 and 10. This ratio is preferably not less than 1, or the electrical conductivity becomes rather too low. The ratio is preferably no more than about 10 or 20, or a coherent film will not be formed; however where other solids are present, such as in a composite anode, a larger ratio is possible than in an electrolyte layer, as some of the liquid becomes associated with the solid.

We claim:

1. An electric cell incorporating an organic electrolyte material comprising a polymer material in a polymeric chain consisting primarily of vinylidine fluoride by weight, onto which is grafted a mono-unsaturated carboxylic, sulphonic or phosphonic acid, ester, or amide, the electrolyte also comprising a salt and a compatible organic solvent.

2. An electric cell as claimed in claim 1 wherein in said polymer material the polymeric chain is polyvinylidene fluoride homopolymer.

3. An electric cell as claimed in claim 1 wherein in said polymer material the polymeric chain is a copolymer or terpolymer, and wherein the vinylidene fluoride is at least 75% by weight of the chain.

4. An electric cell as claimed in claim 1 wherein in said polymer material the monomers to be grafted consist of a carbon chain R—, and one or more carboxyl groups —COOH, sulphonic acid groups —SO$_2$OH, phosphonic acid groups —PO(OH)$_2$, ester groups COOR', or amide groups —CONH$_2$, where R includes less than five carbon atoms.

5. An electric cell as claimed in claim 4 wherein the grafted monomers are acrylic acid or methacrylic acid.

6. An electric cell as claimed in claim 1 which includes a composite electrode comprising the said electrolyte material combined with an insertion material.

7. An electric cell as defined in claim 6 which also includes a current collector formed of a metal, wherein said composite electrode is adhered to said current collector.

8. An electric cell as claimed in claim 1 wherein, in said electrolyte material, the ratio of the weight of all the liquid components to the weight of the polymer material is at least 1.

9. An electric cell as claimed in claim 8 wherein the said ratio is in the range of 3 to 10.

10. An electric cell as defined in claim 1 wherein said cell contains lithium, and said organic electrolyte is non-aqueous.

11. An electric cell as defined in claim 1 wherein said cell is non-aqueous, and said organic electrolyte is in the form of a film.

* * * * *